(Model.)
J. C. GOULD.
ANIMAL TRAP.
No. 340,714. Patented Apr. 27, 1886.
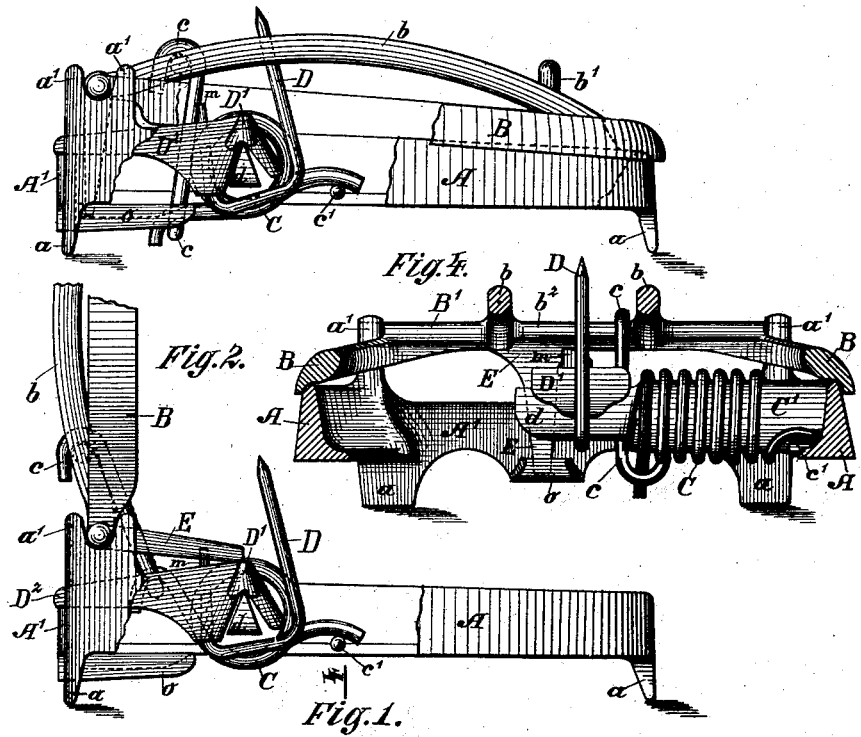
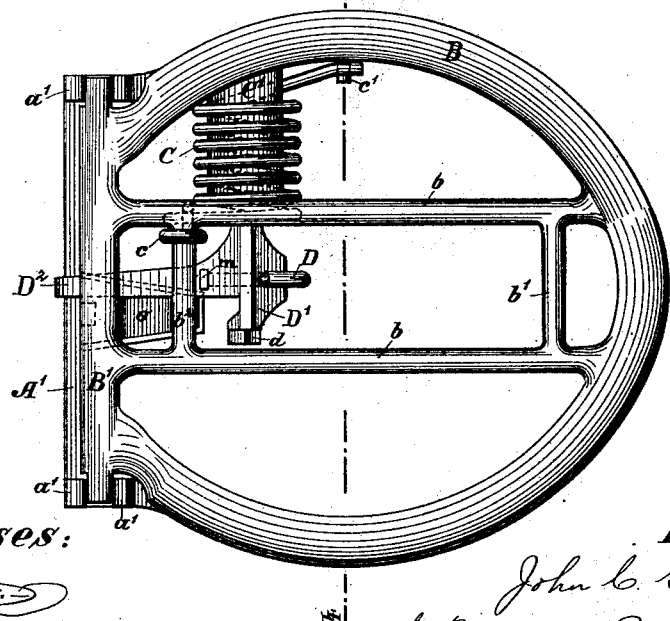
Witnesses:
Inventor:
John C. Gould
by Munday, Evarts & Adcock
his attys.

UNITED STATES PATENT OFFICE.

JOHN C. GOULD, OF CHICAGO, ILLINOIS.

ANIMAL-TRAP.

SPECIFICATION forming part of Letters Patent No. 340,714, dated April 27, 1886.

Application filed August 4, 1885. Serial No. 173,495. (Model.)

*To all whom it may concern:*

Be it known that I, JOHN C. GOULD, a citizen of the United States, residing in Chicago, in the county of Cook and State of Illinois, have invented a new and useful Improvement in Animal-Traps, of which the following is a specification.

In this invention I have endeavored to cheapen the cost of manufacture to the utmost, and also to devise a trap which is efficient and easily set.

The nature of my invention is fully set forth below, and illustrated in the accompanying drawings, wherein—

Figure 1 is a plan view of the trap closed. Figs. 2 and 3 are side elevations, partly broken away, respectively showing the trap set and closed. Fig. 4 is a cross-section on line 4 4 of Fig. 1.

In the drawings, A represents the open frame of the trap, which may be given the general outline of a horseshoe, though that is a matter of fancy. Feet $a a$ support the frame at a slight elevation, and the heels of the shoe are connected by a bar, A'. In open bearings in ears $a'$ upon frame A is hinged the spring-actuated cover B, preferably of an outline similar to that of frame A, and having also a rear bar, B'. Extending across this upper frame or cover are ribs $b$, which serve, when the trap is set, to prevent access to the bait from the rear. Between these ribs are connecting-bars $b'$ and $b^2$, the former giving a grasp or hold for the finger when the trap is to be opened and set, and the latter acting as a means of attachment for the cover, as hereinafter described.

When the trap is sprung, the cover B is closed down upon the frame A by the force of spring C, coiled around the arm C', cast upon frame A, and extending inwardly, as shown, the spring being joined to the cover by the link $c$, which may be made of a piece of wire, with one end hooked over bar $b^2$ and the other under the end of the spring. The other or stationary end of the spring rests upon a projection, $c'$, upon the frame.

The bait-holder is composed of a point, D, and a piece, D', grooved upon the under side, so it may be supported by and rock on the inverted-V-shaped edge of the inner end, $d$, of arm C', said point being so formed as to pass under the part $d$ and into proper position for the bait. The point is thus made to retain the bait-holder against vertical displacement. The extension $D^2$ on the rear of the bait-holder serves as a counter-weight to rock the holder into position to catch the stop-arm E on the cover when the trap is set; also, by reason of its position relative to said stop-arm, to prevent the holder from slipping off the inverted-V-shaped edge $d$, and also, in connection with the bars A' and B', between which it vibrates, to limit the rocking movement of the holder.

When the trap is set, the stop-arm E, which projects from the bar B' of the cover, rests upon the piece D' of the bait-holder, as illustrated in Fig. 2, and the force of the spring is resisted thereby; but a very slight movement of the bait-holder will release the arm E and leave the cover free to close down in obedience to the spring.

A guard, $m$, on the extension of the bait-holder, by its contact with the stop-arm when the trap is set, prevents the extension of the holder from getting under the arm and interfering with it when the trap is sprung.

$o$ is a guard cast upon the frame A and cated directly under the arm E, and is intended to prevent interference with the movements of said arm, such as might happen if the trap were placed upon an uneven surface.

The edge of the cover slightly overlaps and passes below the edge of the frame when the trap is closed. I deem this an aid in preventing escape of any animal caught, as the parts act together very much after the fashion of a rope-clamp, which forms a bend in the rope for greater security in holding it against slipping.

By reason of the construction shown the power of the spring becomes more and more felt as the cover approaches the closed position, and less so as the cover is raised to the open position. This insures the holding of any game caught, and it also renders easy the setting of the trap.

In the construction of the trap the cover and stop-arm are made in one piece of casting, the frame and arm C' $d$ form a second piece, and the bait-holder and its extension a third piece, and these pieces can, when properly made, be put together without fitting of one to the other, and without any fastening save such as is afforded by the other parts of the trap.

I claim—

1. In a trap, a frame carrying a coiled spring and the cover hinged to said frame in upwardly-open bearings, in combination with said spring and a link connecting the same with the cover, substantially as specified.

2. The trap consisting of the frame having the arm C' d, the cover carrying the stop-arm E, the bait-holder, and the spring and link, substantially as set forth.

3. The trap consisting of the frame A A' and arm C' d, cast in one piece, the cover B B' and arm E, cast in one piece, the bait-holder and its extension, cast in one piece, the spring, and the link, substantially as specified.

4. The trap consisting of an open frame carrying within it a support for the spring and bait-holder, a cover hinged to said frame in open bearings and having a stop-arm, a bait-holder, a spring, and a link connecting the spring to the cover, all combined and operating substantially as specified.

5. The bait-holder D D', having the rear extension acting as a counter-weight, in combination with the support d, substantially as specified.

6. The bait-holder consisting of the under grooved piece, D', and the point D, in combination with the inverted-V-shaped support d, substantially as specified.

7. The bait-holder D D', having the rear extension and the support d, in combination with the bars A' B', substantially as specified.

8. The bait-holder D D', having the rear extension and guard m, and the support d, in combination with the stop-arm E, substantially as specified.

9. In a trap, a frame and a hinged spring-cover, the latter overlapping the edge of the frame when closed thereon, substantially as specified.

10. The cover and its stop-arm E, in combination with the frame and its guard o, substantially as specified.

JOHN C. GOULD.

Witnesses:
PATRICK F. CORRIGAN,
H. M. MUNDAY.